United States Patent [19]

House et al.

[11] Patent Number: 5,470,890

[45] Date of Patent: * Nov. 28, 1995

[54] BIS-(N-ALKYLAMINOCYCLOHEXYL)METHANES AS CURING AGENTS IN POLYURETHANE AND POLYUREA FLEXIBLE FOAM MANUFACTURE

[75] Inventors: David W. House, Arlington Heights; Ray V. Scott, Jr., Schaumburg; Mark J. Gattuso, Palatine, all of Ill.

[73] Assignee: UOP, Des Plaines, Ill.

[*] Notice: The portion of the term of this patent subsequent to May 17, 2011, has been disclaimed.

[21] Appl. No.: 262,106

[22] Filed: Jun. 17, 1994

[51] Int. Cl.$^6$ ............................................. C08G 18/10
[52] U.S. Cl. .......................... 521/128; 521/163; 528/64; 528/67; 528/68; 528/85
[58] Field of Search .................................. 521/128, 163; 528/64, 67, 68, 85

[56] References Cited

U.S. PATENT DOCUMENTS

| | | | |
|---|---|---|---|
| 4,246,360 | 1/1981 | Brown et al. | 521/102 |
| 5,173,516 | 12/1992 | Vratsanos | 521/128 |
| 5,223,551 | 6/1993 | Gattuso et al. | 521/163 |
| 5,312,886 | 5/1994 | House et al. | 528/64 |

*Primary Examiner*—Nathan M. Nutter
*Assistant Examiner*—John M. Cooney, Jr.
*Attorney, Agent, or Firm*—Thomas K. McBride; Eugene I. Snyder

[57] ABSTRACT

Flexible foam resistant to both photochemical and oxidative degradation result from the use of bis(N-alkylaminocyclohexyl)methanes as curing agents for polyisocyanates or polyisocyanate prepolymers. The chain extenders may be used alone or in combination with other polyamines and with polyols. Where the polyisocyanate or polyisocyanate prepolymer is also aliphatic there is outstanding resistance to yellowing.

18 Claims, No Drawings

BIS-(N-ALKYLAMINOCYCLOHEXYL)METHANES AS CURING AGENTS IN POLYURETHANE AND POLYUREA FLEXIBLE FOAM MANUFACTURE

BACKGROUND OF THE INVENTION

As a subclass of commercially available polymers, polyurethane foams have several properties whose advantages confer unique benefits on these products. Compared to many other polymeric foams, polyurethanes have almost immediate recovery when compressed, show excellent bonding to many types of synthetic and natural fibers, have a high index of insulation, and can be made with a very high percentage of open cells or a combination of open and closed cells. Many of the advantages of polyurethane foam are due to the tremendous versatility of the material. Polyurethane foams can be manufactured from the very soft to the very rigid by making only small, simple changes in the formulation. They may be made at temperatures lower than 25°C. to over 100°C. The polyurethane foams are by far one of the easiest to process. They can be poured by hand or machine, made in batch mode or made continuously and poured onto a conveyor belt to produce long buns, injected into molds, and even fabricated to produce an integral skin at the same time it produces the lower density foam core. This last type of product is also produced using the technique of reaction injection molding (RIM). Compared to other plastics, polyurethanes are non-brittle, much more resistant to abrasion, and exhibit good elastomeric memory. Polyurethanes find use in such diverse products as bushings, gaskets, washers, scraper blades, mattresses, furniture cushioning, car seats, headrests, shock absorbing pads, protective cushioning, protective packaging, insulation, filling and sealing cracks, shoe soles, window frames, automobile bumpers, dashboards, and appliance housings.

Part of the utility of polyurethane foams derives from their enormous diversity of properties resulting from a relatively limited number of reactants. Polyurethane foams are typically prepared by allowing a polyisocyanate to react with a combination of backbone polyols (e.g., polyols with molecular weights above about 500), curing agents (typically polyols with molecular weights below about 500), blowing agent(s), surfactant(s), catalyst(s), and possibly other additives such as fillers, pigments, softening agents, and flame retardants. The polyisocyanates may be chosen from polyisocyanate monomers, prepolymers, modified polyisocyanates such as trimerized polyisocyanates, carbodiimide-modified polyisocyanates, or from any other of the several types of variants. In all cases, a suitable blowing agent is used. Curing is the reaction of the terminal isocyanate groups with the active hydrogens of a polyfunctional compound so as to form high polymers through chain extension and, in some cases, crosslinking. In the prior art, polyols are almost exclusively used as the curing agents for MDI- and TDI-based foams. Where a triol or a high polyhydric alcohol is used crosslinking occurs to afford a non-linear polymer. Components such as catalysts, pigments, surfactants, and blowing agents also may be present.

Although other polyfunctional chemicals, especially diamines, are theoretically suitable, with but a few exceptions none have achieved commercial importance as a curing agent and then not for flexible foams. Generally speaking, primary polyamines react with polyisocyanates, and especially MDI-based polyisocyanates, so quickly that they are not usable as curing agents (or additives) for flexible foam. The exception to this is the amines generated internally from the reaction of the small amount of water, used to "blow" the reaction, with the polyisocyanates. One reason that polyhydric alcohols generally have gained acceptance as curing agents for flexible foams is that their reaction with polyisocyanates is sufficiently fast to be convenient, but not so fast as to make it difficult to work with the resulting polymer. In producing foams it is desirable that the cream time be reasonably short, yet long enough for the material to be injected into molds or poured onto the conveyor. The material must also be fluid long enough for suitable foaming to occur (rise time).

One difficulty with the flexible foams of the prior art is their tendency to discolor, especially to yellow, accompanying oxidation or photochemically-induced degradation. Consequently, most flexible foams have incorporated antioxidants and/or ultraviolet stabilizers in their formulation, leading to increased costs, often with limited or uncertain benefits. Yellowing is most often associated with aromatic curing agents, consequently there is a great deal of incentive to prepare foams using completely aliphatic curing agents. We have found that the class of bis-(N-alkylaminocyclohexyl)methanes as curing agents affords flexible foams having quite desirable properties with respect to outstanding resistance to yellowing.

SUMMARY OF THE INVENTION

A purpose of our invention is to provide diamines which may be used as chain extenders to provide light-stable flexible foams of the polyurethane and polyurea types. An embodiment comprises diamines of the subclasses bis(4-N-alkylaminocyclohexyl)methane and bis(4-N-alkylamino-3-alkylcyclohexyl)methane, where the alkyl groups are lower alkyls of not more than 10 carbons when bonded to nitrogen and not more than 5 carbons when bonded to the cyclohexyl ring. In a specific embodiment the diamine is bis(4-N-secbutylaminocyclohexyl)methane. In another specific embodiment the diamine is bis(4-N-sec-butyl-3-methylcyclohexyl)methane. Other embodiments and aspects will be clear from the following description.

DESCRIPTION OF THE INVENTION

The subject polymers of this application are flexible foams which are the reaction products of one or more polyisocyanate reactants with isocyanate-reactive amines belonging to the class of bis(N-alkylaminocyclohexyl)methanes and blends of these amines with other isocyanate-reactive materials, principally polyols. Quite generally, the flexible foams are made by reacting an "A-side" polyisocyanate with a "B-side" mixture containing all other components, reactive or not, occurring in the foam. Such components include backbone polyols, curing agents, surfactants, cocatalysts, fillers, blowing agents, softeners, flame retardants, and so forth. Since the art of flexible foam manufacture is so well known we shall treat most components only briefly except for the diamine curing agents of our invention.

The polyisocyanate reactant may be a monomeric polyisocyanate or a prepolymer, which is an isocyanate-terminated reaction product of a monomeric polyisocyanate with polyols. Where 2 equivalents of a monomeric polyisocyanate are reacted with one equivalent of a polyol the product is referred to as a "full prepolymer"; where 2 equivalents of a monomeric polyisocyanate are reacted with less than one equivalent of a polyol the product is referred to as a "quasi prepolymer". For the purpose of this application, an equivalent of a polyhydric alcohol may be defined as an amount which furnishes as many isocyanate-reactive hydrogen atoms from the reactive hydroxyl groups as there are isocyanate groups in the polyisocyanate reactant. Conversely, an equivalent of a polyisocyanate is an amount which furnishes as many isocyanate groups as will completely react with the hydroxyl hydrogens present. A "full prepolymer" is exemplified by the reaction of two moles of a diisocyanate, OCN—Y—NCO, with one mole of diol, HO—Z—OH,

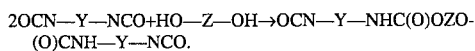

2OCN—Y—NCO+HO—Z—OH→OCN—Y—NHC(O)OZO-(O)CNH—Y—NCO.

Although the isocyanate-terminated prepolymers are represented above ideally as a 2:1 reaction product, more generally they may consist of short polymeric segments arising from further reaction of the above with a polyol.

The prepolymers, whether full or quasi, then can be reacted with the polyamines of this invention either a) alone, b) in combination with polyols, or c) in combination with other polyamines, leading to some diversity among the flexible foams. Where a prepolymer is subsequently reacted with the polyamines of this invention there are formed foams having both urethane linkages (from the prepolymer) and urea linkages (from the chain extension reaction), but the product still is referred to as a polyurethane.

The polyisocyanate reactant, whether a monomer, a prepolymer, or some mixture, is then reacted with the amines of this invention and the other polyisocyanate reactive components. Since the amines are secondary diamines they act only as chain extenders to afford the flexible foams of this invention. With the possibility of reacting the polyisocyanate reactants with a blend of amines of this invention and polyols comes further diversity depending upon the particular nature of the polyols and the relative amount of polyols in the blend. This is especially true where the polyisocyanate reactant is a monomeric polyisocyanate which is reacted with a polyol-polyamine blend.

Among the polyisocyanate reactants used in the practice of this invention are monomeric polyisocyanates which are at least diisocyanates. Examples of such polyisocyanates which may be used in the practice of this invention include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, toluidine diisocyanate and alkylated benzene diisocyanates generally; methylene-interrupted aromatic diisocyanates such as methylene-diphenyl-diisocyanate, especially the 4,4'-isomer (MDI) including alkylated analogs such as 3,3'-dimethyl-4,4'-diphenyl-methane diisocyanate; such hydrogenated materials as cyclohexylene diisocyanate, 4,4'-methylenedicyclohexyl diisocyanate (H12MDI); mixed aralkyl diisocyanates such as the tetramethylxylyl diisocyanates, OCN—C(CH$_3$)$_2$—C$_6$H$_4$C(CH$_3$)$_2$—NCO, and the diisocyanate popularly referred to as isophorone diisocyanate, which is 3,3,5-trimethyl-5-isocyanato-methylcyclohexyl isocyanate; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Since an all-aliphatic flexible foam is particularly desirable as resistant to yellowing, the aliphatic monomeric polyisocyanates are especially desirable in the practice of this invention.

As previously noted the polyisocyanate reactant may be a polyisocyanate prepolymer, which is a reaction product of a monomeric polyisocyanate with up to 0.5 equivalents of compounds having isocyanate-reactive hydrogens, primarily polyols. Where the prepolymer is a quasi prepolymer the monomeric polyisocyanate is reacted with from about 0.05–0.49 equivalents of compounds having isocyanate-reactive hydrogens, most typically between about 0.05 and 0.3 equivalents. The polyols used in prepolymer preparation are referred to as "backbone polyols." This is a diverse class but backbone polyols otherwise are rather well known, are usually dihydric or trihydric with higher polyhydric polyols used to a lesser degree. Examples of suitable backbone polyols include ethylene glycol, 1,2-propylene glycol, 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, pentaerythritol, mannitol, sorbitol, diethylene glycol, triethylene glycol, tetraethylene glycol, poly(ethyleneoxy) glycols generally, dipropylene glycol, poly(propyleneoxy) glycols generally, dibutylene glycol, poly(butyleneoxy) glycols generally, and the polymeric glycol from caprolactone, commonly known as polycaprolactone.

Other polyhydroxy materials of higher molecular weight which may be used as backbone polyols are polymerization products of epoxides, such as ethylene oxide, propylene oxide, butylene oxide, styrene oxide, and epichlorohydrin, with materials having reactive hydrogen compounds, such as water and, more particularly, alcohols, including ethylene glycol, 1,3- and 1,2-propylene glycol, trimethylolpropane, etc. Amino alcohols may be made by condensing amino-containing compounds with the foregoing epoxides, using such material such as ammonia, aniline, and ethylene diamine.

Hydroxyl-containing polyesters, polythioethers, polyacetals, polycarbonates, and polyester amides also may be used as backbone polyols instead of or together with the foregoing polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Hydroxyl-containing polythioethers, polyacetals, polycarbonates, and polyesteramides are less frequently employed in the preparation of RIM-based materials. However, these are sufficiently well known to those practicing the art that they need not be further elaborated upon here.

A major difference between the use of dihydric polyols and the higher polyols as backbone polyols is that the latter invariably give rise to crosslinking. That is, any polyol containing three or more hydroxyl groups in the molecule can effectively act as a crosslinking agent to form a three-dimensional network of chains in the resulting prepolymer, whereas use of a dihydric polyol will lead only to linear chains unless the polyisocyanate contains more than 2 isocyanate groups. It bears repetition to note that where resistance to yellowing is paramount, aliphatic backbone polyols have great advantages.

The polyisocyanate reactants are then reacted (cured) with the diamines of our invention, bis(N-alkylaminocyclohexyl)methanes acting as a chain extender, the backbone polyols, and any other suitable polyisocyanate-reactive components. The structure of our chain extenders is

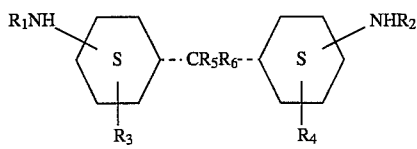

The groups $R_1$ and $R_2$ are alkyl groups, both linear and branched, each of which may contain from 1 up to about 10 carbon atoms. Although $R_1$ and $R_2$ need not be the same, in most cases they will be identical simply because of the convenience of their preparation. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The preferred $R_1$ and $R_2$ contain at least three carbons, and the butyl group is particularly favored, and within the latter the sec-butyl group is greatly preferred.

$R_3$, $R_4$, $R_5$ and $R_6$ each are independently selected from the group consisting of hydrogen and alkyl groups containing from 1 up to about 5 carbon atoms, although in the most usual case $R_3$ and $R_4$ will be the same. The alkyl groups from which $R_3$, $R_4$, $R_5$ and $R_6$ may be chosen are identical with those mentioned for $R_1$ and $R_2$ except for the limitation that they contain no more than about 5 carbon atoms. The case where $R_5$ and $R_6$ are hydrogen is particularly favored. The cases where $R_3$ and $R_4$ are methyl or hydrogen and $R_5=R_6=H$ are especially preferred.

The bis(N-alkylaminocyclohexyl)methanes of this invention are represented such that the alkylamino group may be placed anywhere on the ring relative to the $CR_5R_6$ group, and the groups $R_3$ and $R_4$ may occupy any position relative to the alkylamino groups. Even though there is no limitation as to the relative positions of the alkylamino groups and $R_3$, $R_4$, that variant where the alkylamino groups are at the 4,4'-positions relative to the $CR_5R_6$ bridge is most common, and where $R_3$ and $R_4$ are alkyl groups it is most likely that they occupy the 3- and 3'-positions.

The polyisocyanate reactants are used at a level of from about 0.85 up to about 1.25 equivalents per equivalent of the sum of all the polyisocyanate-reactive components (backbone polyols, water, bis(N-alkylaminocyclohexyl)methane, any other polyisocyanate-reactive materials), which is frequently expressed as 85–125 index of polyisocyanate. Most typically, the polyisocyanate is used stoichiometrically or in slight excess of 5–15% over that required, i.e., the preferred range of polyisocyanate is 100–115 index or 100–115% (1.00–1.15 equivalents per equivalent of all polyisocyanate-reactive components).

The polymers of our invention also may be formed by reacting from about 0.85 up to about 1.25 equivalents of the polyisocyanate reactants with 1 equivalent of the sum of all the polyisocyanate-reactive components which encompasses the backbone polyols, water, any other polyisocyanate-reactive components and a blend of the secondary amines of our invention with a polyol or polyols.

The polyols which are blended with the secondary amines of our invention are generally difunctional, trifunctional, or tetrafunctional polyols, and are used to tailor the final properties of the resulting polymer. They are commonly used at a level between about 0.10 and 2.0 equivalents per equivalent of the diamines of our invention.

The alkylated diamines of this invention typically are prepared by conventional alkylation procedures performed on the precursor primary amines, a representative of which may be found in the examples herein. The precursor primary amines are materials of commerce which are readily available and whose preparation need not be described here.

Catalysts are needed in making foams to decrease the reaction time in order to obtain a mixture which sets sufficiently rapidly to conform to the foam process requirements. Tertiary amines such as triethylamine, tributylamine, N-methylmorpholine, N-ethylmorpholine, 1,4-diaza-bicylo-(2,2,2)-octane, N-cetyl dimethylamine, N-methyl-N'-dimethylaminoethyl-piperazine, N,N-dimethylbenzylamine, N,N-dimethylcyclohexylamine, and 1,2-dimethylimidazole are usually the primary catalysts used in foams. Organic tin compounds may also be used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or as a complex with amidines such as amino pyridines, amino pyrimidines, hydrazino pyridines, and tetrahydropyrimidines. Other catalysts based on metals, such as lead, iron, mercury, bismuth, cobalt and manganese also have been used, and include compounds such as cobalt(III) acetylacetonate, cobalt naphthoate, manganese naphthoate, lead oleate, zinc naphthenate and zirconium naphthenate. Other catalysts such as silaamines and basic nitrogen compounds such as tetraalkylammonium hydroxide, alkali metal hydroxides such as sodium hydroxide, and alkali metal alcoholates such as sodium methylate also have been used as catalysts. These catalysts are generally used in an amount from about 0.01 to about 10% by weight, preferably from about 0.05 to about 1.0% by weight, based on the quantity of polyisocyanate and the quantity of materials reacting with the polyisocyanate.

The mixture of isocyanate-reactive components also may contain other materials, such as surfactants. Examples of surfactants include the sodium salts of sulfonates or of fatty acids, amine salts of fatty acids, alkali metal or ammonium salts of sulfonic acids, polyether siloxanes, and the like. The component mixture also may contain pigments, dyes, flame retardants, stabilizers, plasticizers, fungicides and bactericides, and fillers.

Foams often are prepared by the one-shot process well known to those skilled in the art. In the one-shot process all components, i.e., polyisocyanate, amines of our invention, blowing agent such as water, backbone polyols, and so forth, are metered into a mixing head where they are violently agitated for a predetermined time, typically 1–4 seconds. The mixture is then discharged into a mold or onto a conveyor belt where it is allowed to expand and begin the curing reaction. The time required for the mixture to exhibit an increase in viscosity indicating the initiation of the polymerization reaction is known as the cream time. The time elapsed between the initial mixing of the components and the time at which the flexible polyurethane foam reaches its maximum volume is known as the rise time. For most applications a maximum cream time of 20 seconds and a maximum rise time of 2 minutes are desirable. When the foamed polyurethane has cured sufficiently to allow convenient handling, typically after 15–60 minutes at room temperature, it may be reticulated by being passed between rollers which compress the foam mass and rupture many internal cell walls. Following reticulation, the foam is optionally allowed to cure for an indefinite period of time at room temperature prior to conversion into an end product.

EXAMPLES

Materials

Desmodur N-3200 from Miles, Inc. is a biuret of hexamethylene diisocyanate with an NCO content of 25.7%. Desmodur H, also from Miles, Inc., is 1,6-hexamethylene diisocyanate and has an NCO content of about 50%. Voranol 234–630 (Dow Chemical) is a polyether polyol with an average M.W. of 267, typical hydroxyl No. of 630, and functionality of 3. Dabco 33LV and Dabco T-12 (Air Products and Chemicals) are a triethylene diamine and dibutyltin dilaurate catalyst, respectively. Pluracol 380 is a polyether triol from BASF. NIAX C-174 is a tertiary amine catalyst (Union Carbide). Tegostab B4690 is a surfactant (Goldschmidt Chemical Corporation), and DEOA is dimethanol amine, a crosslinker (Aldrich Chemical Co., Inc.).

General Preparation of the Polyurethane Foams

The procedure illustrates formulations based on the one-shot method; however, with minor modifications, it can be used in a 2-stage process when prepolymers are employed instead of MDI monomers. The MDI-based isocyanate used to illustrate the invention is ISO 233, which is a mixture of MDI monomer and polymeric MDI (PMDI) and has an NCO content of about 25.7%. ISO 233 is available from BASF and is designed for use in foams. There are also many other MDI-based isocyanates available which may be used in the invention. The isocyanate index, or index, is the ratio of the actual amount of isocyanate used in the formulation to the theoretical amount required to react with all of the isocyanate-reactive ingredients.

Laboratory Scale

The polyol(s), the diamine(s) of the examples, catalysts, foam stabilizers, water, other blowing agents, if any, and other additives were mixed together thoroughly with a high shear stirring paddle at 2250 rpm in a quart-sized unwaxed paper cup. The polyisocyanate, weighed out separately, was then added to the cup containing the mixture of isocyanate-reactive components and was thoroughly blended for 8 seconds. This mixture was poured into a cardboard box and allowed to rise. The cream time and rise time were recorded. The foam samples, after rising, were placed in an oven at 100°C. for 10 minutes, after which they were allowed to post-cure for 3 days at room temperature. After 3 days, they were cut into appropriate sized specimens for testing. Other reaction and curing conditions may be used depending on the reaction components, specific reaction conditions, and the intended application.

Large Scale

The formulations below may also be used on a large scale by using low and high pressure foam machines, mixing machines which may or may not be attached to sprayers, and reaction injection molding machines.

Mechanical Properties

The mechanical properties of the foams produced in the following examples are determined by the ASTM method No. D3574–86(1986) which includes the standard tests for density, tensile strength, elongation, tear strength, compression force deflection (CFD), SAG factor, dry compression set, and humid aged compression set. SAG is defined as the ratio of CFD at 65% deflection to CFD at 25% deflection. The cross-head speed of the tensile tester in the compression force deflection test was 2.00 inches per minute.

Air flow measurements were carried out using a Hampden Porosity Tester (Hampden Test Equipment Ltd., England). The sample specimens were cut from 1-inch thick foam pieces (perpendicular to the foam rise) using a 1.5-inch diameter punch. The back pressure on the porosity tester was kept constant at 100 Pa, and the air flow reported in liters per minute.

EXAMPLE 1

Preparation of Diamine A [Bis-(4-N-sec-butylaminocyclohexyl)-methane] and Diamine B [Bis-(4-N-sec-butylamino-3-methylcyclohexyl)-methane]

Diamine A was prepared by reductively alkylating di-(4-aminocyclohexyl)-methane with methyethylketone over a catalyst composed of 0.375% platinum on alumina with hydrogen present. The catalyst can be used as a powder, sized particles, or as 1/16 inch spheres, depending upon the reactor size and type. The reactors were pressurized with hydrogen. When the materials were prepared using a stirred autoclave, the pressures were between 1,000 and 1,500 psi and the reaction times between 5 and 8 hours. When prepared using a continuous, fixed-bed reactor, the pressure was maintained at about 800 psi and the feed rate was about 1 LHSV.

The temperature range which can be used in these reactions is between 100° and 140°C., with the preferred range between 100° and 120° C. The ratio of MEK to the amine can be from about 6 to 8 moles of MEK to 1 mole of amine. Upon completion of the reaction, the excess MEK and water are stripped from the reaction mixture leaving almost exclusively Diamine A. The water may also be removed from the reaction by the addition of a drying column at the end of the continuous reactor. The product is a clear, virtually colorless liquid. Diamine B was similarly prepared using di-(4-amino-3-methylcyclohexyl)methane as the starting amine with comparable results.

EXAMPLE 2

Each of the following formulations (except the control sample #1) in Table 1 were used to make a low density flexible foam having low hardness.

| MDI-POLYETHER FOAM: LEVEL STUDY | | | | | |
|---|---|---|---|---|---|
| Diamine B, php[a] | 0 | 1.13 | 1.70 | 1.99 | 2.27 |
| Pluracol 380, php | 100 | 100 | 100 | 100 | 100 |
| Water, php | 3.7 | 3.7 | 3.7 | 3.7 | 3.7 |
| Dabco 33-LV, php | 0.3 | 0.3 | 0.3 | 0.3 | 0.3 |
| NIAX C-174, php | 0.6 | 0.6 | 0.6 | 0.6 | 0.6 |
| DEOA, php | 0.5 | 0.5 | 0.5 | 0.5 | 0.5 |
| Teg B-4690, php | 0.7 | 0.7 | 0.7 | 0.7 | 0.7 |
| ISO 233 (Index), % | 100 | 100 | 100 | 100 | 100 |
| Cream Time (sec) | 9 | 8 | 8 | 8 | 8 |
| Rise Time (sec) | 67 | 74 | 81 | 82 | ~80 |
| Oven Temp/Time (min) | 100/10 | 100/10 | 100/10 | 100/10 | 100/10 |
| Density (pcf) | 2.82 | 2.46 | 2.41 | 2.50 | 2.62 |
| Tensile Strength ∥ (psi) | 27.7 | 24.6 | 20.9 | 29.0 | 25.5 |
| Tensile Strength ⊥ | 24.7 | 21.1 | 20.4 | 18.6 | 21.3 |

MDI-POLYETHER FOAM: LEVEL STUDY -continued

| (psi) | | | | | |
|---|---|---|---|---|---|
| Elongation ∥ (%) | 78 | 66 | 61 | 79 | 71 |
| Elongation ⊥ (%) | 92 | 94 | 90 | 81 | 71 |
| Tear Strength (pli) | 1.81 | 1.76 | 1.90 | 1.95 | 1.84 |
| CFD: | | | | | |
| 25% (psi) | 0.57 | 0.44 | 0.40 | 0.46 | 0.52 |
| 65% (psi) | 1.45 | 1.15 | 1.08 | 1.23 | 1.43 |
| Comfort Factor | 2.54 | 2.61 | 2.70 | 2.67 | 2.75 |
| Resilience (Ball, %) | 49 | 43 | 48 | 44 | 45 |
| Compress Set: | 16 | 21 | 35 | 40 | 40 |
| Dry (%) | | | | | |
| Humid Aged, | | | | | |
| 70° C. (%) | 22 | 33 | 44 | 44 | 46 |
| 105° C. (%) | 13 | 15 | 24 | 25 | 27 |
| Airflow (uncrshed), 100 Pa | 13 | 13 | 13 | 11 | 19 |

$^a$php = parts per hundred parts

The important properties which the aliphatic diamines of our invention confer which should be noted are:

1. They do not lead to yellowing of the foam (though the aromatic polyisocyanate can).
2. They do not impart any color to the foam.
3. The aliphatic diamines actually lead to a reduction in the foam density. This can eliminate or reduce the need for CFCs, HCFCs, or volatile hydrocarbons as auxiliary blowing agents. Particularly note the foam using 1.70 php of Diamine B.
4. The hardness of the foam can be lowered with the use of the diamines. This may also help eliminate or reduce the need for auxiliary blowing agents such as CFCs, HCFCs, or volatile hydrocarbons.
5. The density reduction is accomplished without significantly affecting tensile strength, elongation, tear strength or rebound.

EXAMPLE 3

All-Aliphatic Polyether Foams

The following formulation is but exemplary of this class of flexible foam.

| Pluracol 380 | 100 php |
|---|---|
| Voranol 234-630 | 10 |
| DEOA | 0.5 |
| Water | 3.7 |
| Dabco 33LV | 0.3 |
| NIAX C-174 | 0.6 |
| Dabco T-12 | 0.5 |
| NaOH | 0.1 |
| Diamine B | 1.75 |
| L-532 | 1.0 |
| Desmodur N-3200 | 100 |

The typical creamtime for the formulation was about 3 minutes and the rise time was 6 minutes. These process times are long compared to commonly used formulations, but the use of a hexamethylene diisocyanate monomer will bring them more in line with those observed for the MDI-based polyisocyanates. A sample formulation is shown below. The level of Dabco T-12 and NaOH can also be adjusted to help modify process times.

| Pluracol 380 | 100 php |
|---|---|
| Voranol 234-630 | 10 |
| DEOA | 0.5 |
| Water | 3.7 |
| Dabco 33LV | 0.3 |
| NIAX C-174 | 0.6 |
| Dabco T-12 | 0.5 |
| NaOH | 0.1 |
| Diamine B | 1.75 |
| L-532 | 1.0 |
| Desmodur H | 110 |

What is claimed is:

1. A polyurethane flexible foam resulting from the reaction of from about 0.85 to about 1.25 equivalents of a polyisocyanate reactant or mixture of polyisocyanate reactants with one equivalent of compounds having isocyanate-reactive hydrogens selected from the group consisting of 1) first polyamines, 2) blends of said first polyamines with polyols, 3) blends of said first polyamines with second polyamines, and 4) blends of said first polyamines with polyols and second polyamines, said first polyamines having the structure

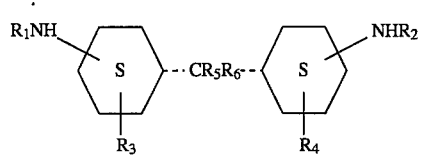

where $R_1$ and $R_2$ are independently selected from the group consisting of alkyl groups with from 1 up to about 10 carbon atoms, and $R_3$, $R_4$, $R_5$ and $R_6$ are independently selected from the group consisting of hydrogen and alkyl groups with from 1 up to about 5 carbon atoms, said reaction conducted in the presence of a blowing agent.

2. The flexible foam of claim 1 where the polyisocyanate reactant is a monomeric polyisocyanate.

3. The flexible foam of claim 1 where the polyisocyanate reactant is an isocyanate-terminated prepolymer.

4. The flexible foam of claim 1 where $R_5$ and $R_6$ each are hydrogen.

5. The flexible foam of claim 1 where $R_3$ and $R_4$ each are hydrogen.

6. The flexible foam of claim 1 where $R_3$ and $R_4$ each are methyl groups.

7. The flexible foam of claim 1 where $R_1$ and $R_2$ each are butyl groups.

8. The flexible foam of claim 7 where $R_1$ and $R_2$ each are sec-butyl groups.

9. The flexible foam of claim 1 where $R_1$ and $R_2$ each are sec-butyl groups, $R_5$ and $R_6$ each are hydrogen, and $R_3$ and $R_4$ are the same and are selected from the group consisting of hydrogen and methyl.

10. A method of making a polyurethane flexible foam comprising reacting from about 0.85 to about 1.25 equivalents of a polyisocyanate reactant or mixture of polyisocyanate reactants with from about 0.2 to about 10 parts water per hundred parts of total polyisocyanate reactants and with one equivalent of compounds having isocyanate-reactive hydrogens selected from the group consisting of 1) first polyamines, 2) blends of said first polyamines with polyols, 3) blends of said first polyamines with second polyamines, and 4) blends of said first polyamines with polyols and second polyamines, said first polyamines having the structure

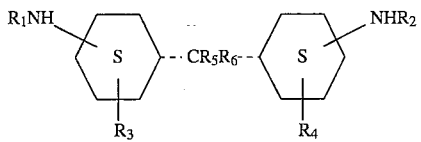

where $R_1$ and $R_2$ are independently selected from the group consisting of alkyl groups with from 1 up to about 10 carbon atoms, and $R_3$, $R_4$, $R_5$ and $R_6$ are independently selected from the group consisting of hydrogen and alkyl groups with from 1 up to about 5 carbon atoms, said reaction conducted in the presence of a blowing agent.

11. The flexible foam of claim 10 where the polyisocyanate reactant is a monomeric polyisocyanate.

12. The flexible foam of claim 10 where the polyisocyanate reactant is an isocyanate-terminated prepolymer.

13. The flexible foam of claim 10 where $R_5$ and $R_6$ each are hydrogen.

14. The flexible foam of claim 10 where $R_3$ and $R_4$ each are hydrogen.

15. The flexible foam of claim 10 where $R_3$ and $R_4$ each are methyl groups.

16. The flexible foam of claim 10 where $R_1$ and $R_2$ each are butyl groups.

17. The flexible foam of claim 16 where $R_1$ and $R_2$ each are sec-butyl groups.

18. The flexible foam of claim 10 where $R_1$ and $R_2$ each are sec-butyl groups, $R_5$ and $R_6$ each are hydrogen, and $R_3$ and $R_4$ are the same and are selected from the group consisting of hydrogen and methyl.

* * * * *